United States Patent [19]

Nakajima

[11] Patent Number: 4,824,267

[45] Date of Patent: Apr. 25, 1989

[54] CONTROL APPARATUS FOR HAMMER TYPE IMPACT PRINTER

[75] Inventor: Yoshinori Nakajima, Tokyo, Japan

[73] Assignee: Ricoh Company, Ltd., Tokyo, Japan

[21] Appl. No.: 893,515

[22] Filed: Aug. 5, 1986

Related U.S. Application Data

[60] Division of Ser. No. 745,750, Jun. 17, 1985, Pat. No. 4,627,751, which is a continuation of Ser. No. 404,799, Aug. 3, 1982, abandoned.

[30] Foreign Application Priority Data

Aug. 7, 1981 [JP] Japan .................................. 56-123059

[51] Int. Cl.⁴ ................................................ B41J 1/30
[52] U.S. Cl. .................................. 400/144.2; 400/62; 400/149; 400/171; 400/175
[58] Field of Search .................. 400/62, 82, 83, 144.2, 400/144.3, 171, 175, 149, 150, 157.3, 166

[56] References Cited

U.S. PATENT DOCUMENTS

| | | | |
|---|---|---|---|
| 3,892,303 | 7/1975 | Wilcox | 400/171 |
| 4,074,798 | 2/1978 | Berger | 400/306 X |
| 4,103,766 | 8/1978 | Ruble | 400/144.2 X |
| 4,138,719 | 2/1979 | Swanstrom | 364/200 |
| 4,217,055 | 8/1980 | Moon | 400/171 X |
| 4,281,938 | 8/1981 | Phillips | 400/151 X |
| 4,408,918 | 10/1983 | Smith | 400/144.2 X |

*Primary Examiner*—Paul T. Sewell
*Attorney, Agent, or Firm*—David G. Alexander

[57] ABSTRACT

An alterable storage unit is included in a control apparatus to store code conversion tables for transforming type data or type position data into various control data such as a hammer pressure, an amount of ribbon feed and an amount of proportional space. When a type element is replaced with another, code conversion tables concerned with the new type element are stored in the storage unit. This permits the code conversion tables to be altered or renewed concentratedly in the event of type element replacement.

4 Claims, 15 Drawing Sheets

|  | b8 | b7 | b6 | b5 | b4 | b3 | b2 | b1 |
|---|---|---|---|---|---|---|---|---|
| 1ST BYTE | PB | 1 | 0 | 0 | 0 | 0 | 0 | 1 |

|  | b8 | b7 | b6 | b5 | b4 | b3 | b2 | b1 |
|---|---|---|---|---|---|---|---|---|
| 2ND BYTE | PB | HF | | | RF | PS | | |

Fig. 7

1ST BYTE

| b8 | b7 | b6 | b5 | b4 | b3 | b2 | b1 |
|----|----|----|----|----|----|----|----|
| PB | 0  | 0  | 1  | 1  | 0  | 1  | 1  |

2ND BYTE

| b8 | b7 | b6 | b5 | b4 | b3 | b2 | b1 |
|----|----|----|----|----|----|----|----|
| PB | 0  | 1  | 0  | 1  | 0  | 1  | 1  |

3RD BYTE

| b8 | b7 | b6 | b5 | b4 | b3 | b2 | b1 |
|----|----|----|----|----|----|----|----|
| PB | HP | HP | HP | RF | PS | PS | PS |

4TH BYTE

| b8 | b7 | b6 | b5 | b4 | b3 | b2 | b1 |
|----|----|----|----|----|----|----|----|
| PB | HP | HP | HP | RF | PS | PS | PS |

96TH BYTE

| b8 | b7 | b6 | b5 | b4 | b3 | b2 | b1 |
|----|----|----|----|----|----|----|----|
| PB | HP | HP | HP | RF | PS | PS | PS |

Fig. 8

|           | b8 | b7 | b6 | b5 | b4 | b3 | b2 | b1 |
|-----------|----|----|----|----|----|----|----|----|
| 1ST BYTE  | PB | 0  | 0  | 1  | 1  | 0  | 1  | 1  |

|           | b8 | b7 | b6 | b5 | b4 | b3 | b2 | b1 |
|-----------|----|----|----|----|----|----|----|----|
| 2ND BYTE  | PB | 0  | 1  | 0  | 1  | 0  | 1  | 1  |

|           | b8 | b7 | b6 | b5 | b4 | b3 | b2 | b1 |
|-----------|----|----|----|----|----|----|----|----|
| 3RD BYTE  | PB | 1  | 0  | 0  | 0  | 0  | 0  | 1  |

|           | b8 | b7 | b6 | b5 | b4 | b3 | b2 | b1 |
|-----------|----|----|----|----|----|----|----|----|
| 4TH BYTE  | PB | HP |    |    | RF | PS |    |    |

|           | b8 | b7 | b6 | b5 | b4 | b3 | b2 | b1 |
|-----------|----|----|----|----|----|----|----|----|
| 5TH BYTE  | PB | 1  | 1  | 0  | 0  | 0  | 0  | 1  |

|           | b8 | b7 | b6 | b5 | b4 | b3 | b2 | b1 |
|-----------|----|----|----|----|----|----|----|----|
| 6TH BYTE  | PB | HP |    |    | RF | PS |    |    |

|           | b8 | b7 | b6 | b5 | b4 | b3 | b2 | b1 |
|-----------|----|----|----|----|----|----|----|----|
| 7TH BYTE  | PB | 0  | 0  | 1  | 1  | 0  | 1  | 1  |

CONTROL APPARATUS FOR HAMMER TYPE IMPACT PRINTER

CROSS REFERENCE TO RELATED APPLICATION

This application is a division of U.S. Patent application Ser. No. 745,750, filed June 17, 1985, now U.S. Pat. No. 4,627,751, issued Dec. 9, 1986, which is a continuation of U.S. Patent application Ser. No. 404,799, filed Aug. 3, 1982, now abandoned.

BACKGROUND OF THE INVENTION

The present invention relates to a control apparatus for an impact printer for use with various computer systems or word processors and provided with a set of interchageable type elements, which may be in the form of type wheels, for printing using different respective character fonts.

In an impact printer of the type described, printing operation is controlled based on various control data matching with the kind, font, size and other factors of type members, such as hammer pressure, amount of ribbon feed and amount of space, for the purpose of reproducing data which are readily identifiable. Since characters are available in upper and lower cases, hammering all the types with a same pressure would render the lower case letters denser than the upper case letters. In light of this, the hammer pressure is varied depending on the size of a character so that all the characters printed out will have a uniform density. Meanwhile, where use is made of a multistrike ribbon which can serve 3–5 times of repeated use throughout its length, some characters may each become uneven in density due to the repeated printing actions in each region of the ribbon. To ensure an even density over each character, the amount of ribbon feed is varied from one type to another. Also, should types be hammered at a predetermined intercharacter spacing, the reproduced characters would appear spaced different distances due to different widths of characters which might cause adjacent characters to overlap or be spaced too much. The intercharacter distance of reproduced data is usually controlled to predetermined one by varying the amount of space depending on the width of a type. It should be noted that the amount of space matching with the width of a specific type is referred to as a "proportional amount of space".

A known expedient for such a print control employs a read only memory or ROM which stores as code conversion tables the control data such as hammer pressures, amounts of ribbon feed and those of proportional spaces which correspond to type data using ASCII codes or JIS codes, for example, or type position data provided by converting the type data. During a print control operation, the code conversion tables are converted into hammer pressures, ribbon feeds and proportional spaces in response to input type data.

Meanwhile, some impact printers of the type described are furnished with a plurality of different kinds of interchangeable type wheels to win a wider range of applications. The type wheels may carry 88, 94, 96 and 128 type elements, respectively. Replacing the type wheel with another can change the kind of types, font, size etc.

In a printer with such interchangeable type wheels, the carriage is movable up and down relative to the printer body to facilitate the replacement of the type wheel which is loaded on the carriage. The carriage lacks grips for manipulation and usually raised with an upwardly extending hammer section held by hand, for instance. This is undesirable, however, because such a functional part of the carriage has been assembled by very delicate positioning. While this problem may be settled if suitable grips are mounted on the carriage independently of the other structural parts, such cannot be accomodated from the viewpoint of space requirement due to the highly compacted construction inherent in this type of products.

It is an object of the present invention to provide a control apparatus for a hammer type impact printer which permits the use of a plurality of different kinds of interchangeable type elements and promotes sure and easy replacement.

It is another object of the present invention to provide a control apparatus for a hammer type impact printer which when a type element is replaced with another, a print control can be effected merely by entering type data but not control data and, thereby, minimizes the intricacy of data processing procedure as well as the data transfer time to the printer.

It is another object of the present invention to provide a control apparatus for a hammer type impact printer which enhances the convenience of operation of the printer by providing a display of the kind of a specific type element to be replaced.

It is another object of the present invention to provide a control apparatus for a hammer type impact printer which allows one to grip the carriage for the replacement of a type element without requiring any additional space.

It is another object of the present invention to provide a generally improved control apparatus for a hammer type impact printer.

Other objects, together with the foregoing, are attained in the embodiments described in the following description and illustrated in the accompanying drawings.

BRIEF DESCRIPTION OF THE DRAWINGS

FIG. 6 illustrates how

FIGS. 7 and 8 show different examples of input data which will be transferred to the printer to alter tables when a type element is replaced;

DESCRIPTION OF THE PREFERRED EMBODIMENTS

While the control apparatus for a hammer type impact printer of the present invention is susceptible of numerous physical embodiments, depending upon the environment and requirements of use, substantial numbers of the herein shown and described embodiments have been made, tested and used, and all have performed in an eminently satisfactory manner.

Reference will first be made to FIGS. 1–4 for describing in detail mechanisms of a hammer type impact printer to which the present invention is applicable.

Figure 1:
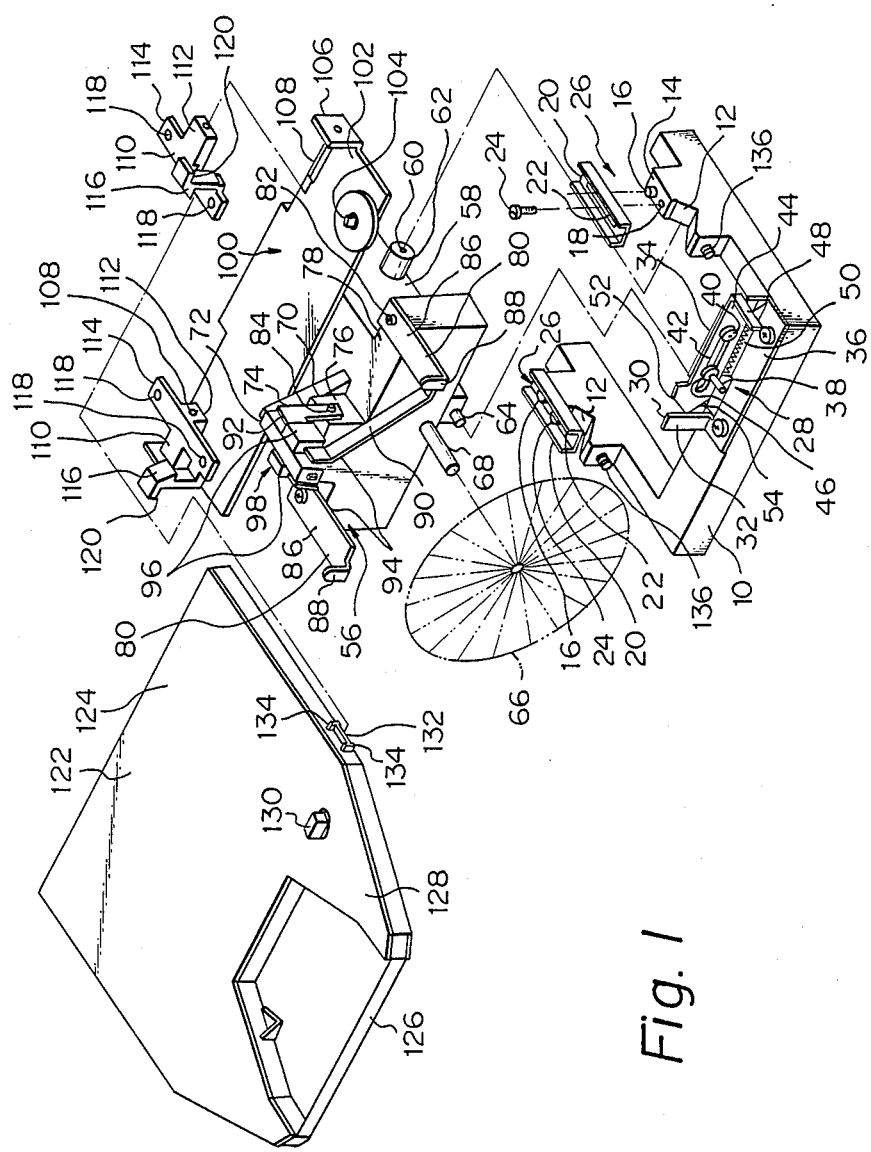
FIG. 1 is an exploded perspective view showing a hammer type impact printer to which the present invention is applicable.
Figure 2:
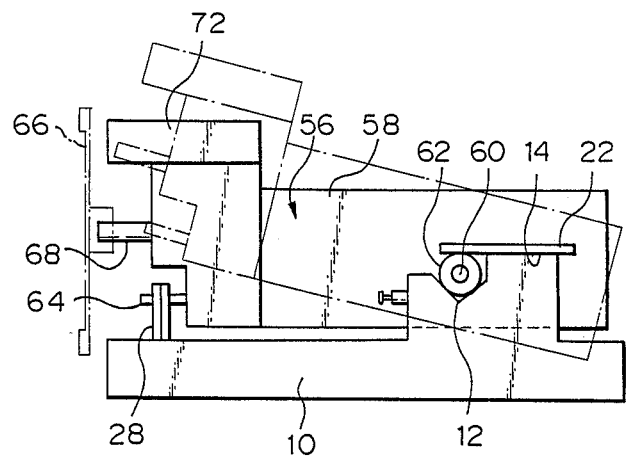
FIG. 2 is a side elevation of a carriage locking mechanism included in the printer shown in FIG. 1.

Referring to FIG. 1, a carrier 10 in the form of a diecasting or the like is reciprocatable on and along a pair of parallel guide rods (not shown). The carrier 10 is formed with a V-shaped upwardly open recess 12 and a flat surface 14 at each of its laterally opposite ends. The flat surface 14 is provided with a positioning pin 16 and a threaded opening 18. A generally channel-shaped presser plate 20 is formed with an elongate slot 22 and laid on each flat surface 14 so that the positioning pin 16 is received in the slot 22. A small screw 24 is threaded into the opening 18 through the slot 22 to fix the presser plate 20 in a desired position. These elements at each lateral end of the carrier 10 constitute a carriage mounting section 26 which is spaced a predetermined distance from and laterally aligned with the one located at the other lateral end.

A carriage locking mechanism 28 is arranged on a front part of the carrier 10. The carriage locking mechanism 28 includes a base plate 36 rigidly mounted on the carrier 10 and having a reference lug 32 which extends upright to define a vertical reference surface 30. A retaining surface 34 also extends upright from the base plate 36 while being offset from the reference lug 32 by an amount equal to a thickness of the base plate 36. Guide pins 38 and 40, one of which is longer than the other, extend horizontally from the retaining surface 34. A locker member 44 is formed with an elongate recess 42 and slidable horizontally with the guide pins 38 and 40 received in its slot 42. The locker member or slider 44 is prevented from slipping out of the guide pins 38 and 40 by stop rings 46 which are secured to the guide pins. The laterally outermost end of the locker member 44 is bent to have a hook 48. A tension spring 50 is anchored at one end to the hook 48 and at the other end to the guide pin 38 so that the slider 44 is constantly biased toward the reference lug 32. The slider 44 is provided with converging upper and lower inclined edges 52 and 54 at the other end.

A carriage is generally designated by the reference numeral 56 and includes a body 58 which may be a die-casting. Pins 60 extend horizontally away from each other at the laterally opposite ends of the body 58. Rollers 62 are free to rotate on the respective pins 60 but prevented from axial movement. A pin 64 is studded on the front end of the body 58 in an intermediate lower portion of the latter. A drive shaft 68 extends from the center of the front end of the body 58 to removably carry a type wheel 66 thereon. A hammer 72 is movable toward and away from the type wheel 66 on a projection 70 of the body 58 above the drive shaft 68. Located to the rear of the hammer 72 is an armature 74 which is operated by a magnet (not shown).

A pair of ribbon guides 80 each in the form of a shaped plate are fastened to the body 58 by small screws 82 and 84 at opposite sides of the projection 70, more specifically at each side wall 76 of the projection 70 and a flat surface 78 which extends from the side wall 76. Each of the ribbon guides 80 is formed with a horizontal surface 86, a vertical tongue 88 extending from the front end of the horizontal surface 86 to position a ribbon cassette as will be described, an upwardly inclined surface 90 contiguous with the horizontal surface 86, and a vertical surface 92 contiguous with the inclined surface 90. The front edges of the contiguous surfaces 90 and 92 are finished smoothly to serve as a guide surface 94 for a ribbon. The vertical surface 92 carries in its intermediate portion a piece of plastic 96 to form a grip section 98. The grip section 98 thus positioned at the opposite sides of the hammer 72 prevents one from directly holding the hammer 72.

Disposed to the rear of the carriage 56 is a ribbon cartridge mounting section which is generally designated by the reference numeral 100. The section 100 comprises a support plate 102 which is rigidly mounted to the body 58 of the carriage 56. A ribbon feed shaft 104 is carried on one side of the support plate 102 to be driven by a motor (not shown). Upright tongues 106 extend from opposite outermost edges of the support plate 102 while retainer pins 108 extend toward each other from the respective tongues 106. A retainer block of elastic plastic 110 is rotatably mounted on each of the retainer pins 108. As shown, each retainer block 110 has a base portion 112 receiving a retainer pin 108 therein, a leg 114 extending in longitudinally opposite directions from the base portion 112, and an upwardly extending pawl 116. Projections 118 extend upwardly from both ends of the top of the leg 114. The uppermost end of each pawl 116 is bent outwardly to form a lug 120 which will be depressed to release a ribbon cartridge. The retainer blocks 110 are individually biased by a tension spring (not shown) such that their front ends face downward.

A ribbon cartridge 122 is removably mounted on the carriage 56. The ribbon cartridge 122 comprises a casing 124 of plastics which stores an endless printing ribbon 126 thereinside. Outside the casing 124, the ribbon 126 spans a pair of leg portions 128 which individually extend forwardly from the casing 124. A shaft 130 is rotatably mounted on the lower end of the casing 124 and provided with a portion which is engagable with the ribbon feed shaft 104, though not shown in the drawing. The shaft 130 can also be rotated by hand whenever required. At each side of the casing 124, there are formed a horizontal lug 132 engagable with corresponding one of the pawls 116 of the retainer block 110, and shoulders 134 located at longitudinally opposite sides of the lug 132 to face both sides of the pawl 116 for thereby keeping the cartridge 122 from longitudinal movement relative to the carriage 56.

Denoted by the reference numeral 136 are pins each being adapted to be connected with a wire (not shown) for driving the carrier 10.

To load the ribbon cartridge 122 on the carriage 56, the former is pressed downwardly with its opposite lugs 132 aligned with the opposite pawls 116 of the cartridge mounting sections 110. Then, the lugs 132 urge the corresponding pawls 116 away from each other due to the inclined tops of the latter until the pawls 116 spring back into contact with the lugs 132. Each pawl 116 becomes positioned between the corresponding shoulders 134 to positively retain the cartridge 122 in position. The tongues 88 of the ribbon guides 80 facilitate positioning of the ribbon cartridge 122.

In this situation, the ribbon 126 engaged with the guide surfaces 94 is in a lowered position because the retainer blocks 110 have faced downward at their front ends as previously mentioned. When a raising mechanism (not shown) is activated, the ribbon cartridge 122 will be rotated together with the retainer blocks 110 to bring the ribbon 126 to its raised position. It will be seen that such a movement of the ribbon cartridge 122 is quite smooth and accompanied by no vibration or the like because the massive support plate 102 is fixed in place. An additional retaining effort will be offered by the legs 114 of the retainer blocks 110 which bend themselves when the pawls 116 lock the ribbon cartridge 122.

Depressing the opposite lugs 120 downwardly will cause the pawls 116 to move away from each other so that one can readily remove the ribbon cartridge 122 out of the carriage 56.

To replace the type wheel 66 with another, the grip sections 98 of the ribbon guides 80 are held by hand and moved upwardly. Then, the pin 64 on the body 58 exerts an upward force on the lower inclined edge 54 of the slider 44 so that the slider 44 is pushed transversely against the force of the spring 50, until the pin 64 moves clear of the carriage locking mechanism 28. This allows the whole carriage 56 to be angularly raised about the horizontal pins 60 to a predetermined position as indicated by a phantom line in FIG. 2. In this instant, the pins 60 rotate relative to their associated rollers 62 which have been firmly retained by the presser plates 20 on the carrier 10. The type wheel 66 can now be replaced by another without being disturbed by any surrounding member such as a platen (not shown). The carriage 56 can be reset on the carrier by simply pressing it downwardly, opposite to the above-mentioned procedure, to a position indicated by a solid line in FIG. 2. This time, the pin 64 abuts against the upper inclined edge 52 of the slider 44 to move it transversely. After the pin 64 has moved downward past the slider, the latter springs backs into retaining contact with the pin 64 at its lower inclined edge 54.

It will be seen that the carriage 56 can be moved up and down without any danger due to the grip sections 98 which keep operator's hands clear of the hammer 72.

The inherent construction and arrangement of the present invention permits the carriage 56 to be removed from the carrier 10. When the screws 26 are loosened to move the presser plates 22 to the rear, the V-shaped recesses 14 become uncovered so that the rollers 62 can be raised out of the recesses 14. To attach the carriage 56 to the carrier 10, on the other hand, the rollers 62 are placed in the V-shaped recesses 14 and the pin 64 is locked in the carriage locking mechanism 28 in the manner described, while maintaining the carriage 56 transversely movable. Then, the pin 64 is positioned in the transverse direction by the reference surface 30 and inclined edge 54 of the mechanism 28. Under this condition, fastening the presser plates 22 to the carrier 10 by the screws 26 with the rollers 62 held therebetween positions the carriage 56 relative to the carrier 10. The carriage 56 thus positioned will not be dislocated thereafter relative to the carrier 10 due to the axially fixed positions of the rollers 62 and their associated horizontal pins 60.

Figure 3:
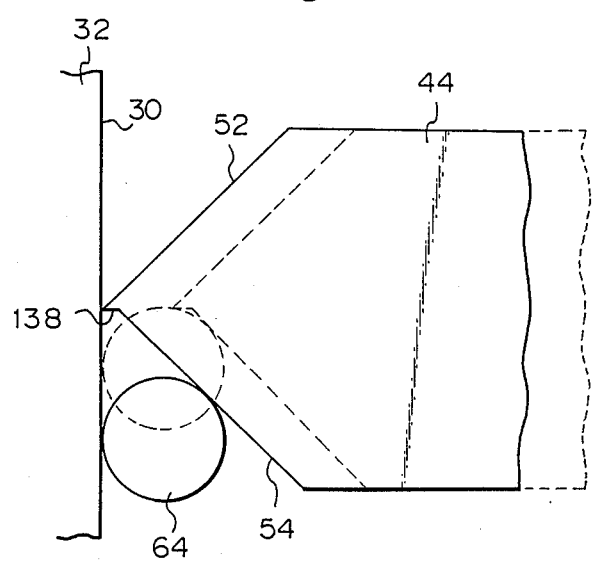
FIG. 3 is a front view of a modification to the mechanism shown in FIG. 2.

FIG. 3 shows a modification to the carriage locking mechanism 28 and which is characterized in that the lower inclined edge 54 of the slider 44 terminates at a flat edge 138 at its upper end. In case where the type wheel 66 carries two trains of type elements in concentric positions, and is movable to two steps during printing operations, the flat surface 138 will prove effective to prevent the carriage 56 from jumping to an excessive level. Naturally, manually moving the carriage 56 upwardly will be resisted by a temporary increase of load which affords a favorable sense of clicking.

Figures 4, 5:
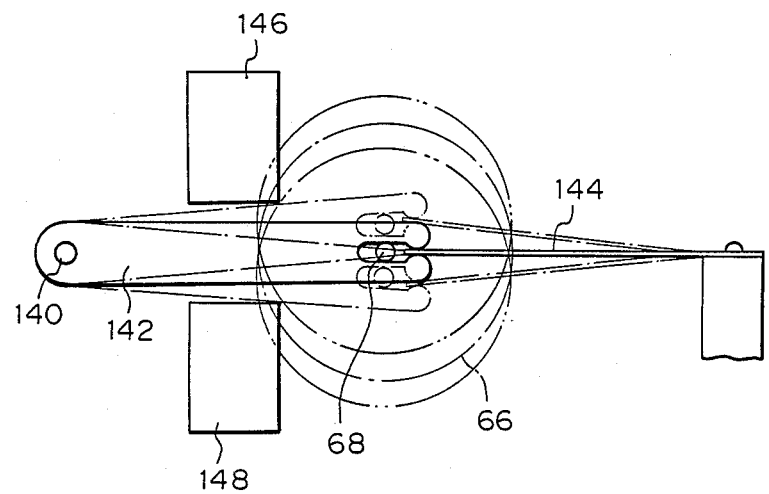
FIG. 4 is a front view of a mechanism for shifting a type wheel to upper and lower positions for the selection of a type on a type wheel.
FIG. 5 shows a data pattern conventionally inputted in a printer after the replacement of a type element.

FIG. 4 illustrates a mechanism which constitutes means for rendering the carriage 56 shiftable to two steps as mentioned above during printing operations. An armature 142 is pivotable about a shaft 140 which is fixed to the carrier 10. The armature 142 retains the drive shaft 68 at its free end. A leaf spring 144 is fixed at one end and fitted at the other end to the armature 142. Magnets 146 and 148 face the armature 142 from vertically opposite sides, respectively. During the course of printing actions, either the upper magnet 146 or the lower magnet 148 is energized to raise or lower the type wheel 66. Because the biasing force of the leaf spring 144 acts only in the linear manner, the leaf spring 144 will be well balanced during its upward or downward movement if provided with a relatively small spring constant and directed to a neutral position. It will be apparent that the "neutral position" implies not a dimensionally neutral position but an essential neutral point of motion with the weight of the carriage 56 also taken into consideration.

When a type wheel of such a hammer type impact printer is replaced by another, the hammer pressure, the amount of ribbon feed and the amount of proportional space will be controlled in a manner described in detail hereunder.

A prior art control of such factors is represented in FIG. 5. As already discussed, it has been customary to store in a read only memory code conversion tables for providing control data on only a standard type wheel of most frequent use; once the standard type wheel is replaced, the code conversion tables cannot be used any longer. This has been coped with by entering alternative control data on one type into the printer together with data on the type, as indicated in FIG. 5. In FIG. 5, the first byte represents the alphabet "A" in ASCII code while the second byte represents an exemplary pattern of control data on the alphabet "A". The data pattern illustrated comprises a parity bit PB, hammer pressure HF, ribbon feed RF and proportional space PS.

As previously pointed out, entering new control data every time data on one type is entered requires the printer to be controlled in an intricate way due to the additional amount of input data. This slows down the data transfer to the printer.

Figure 6A:
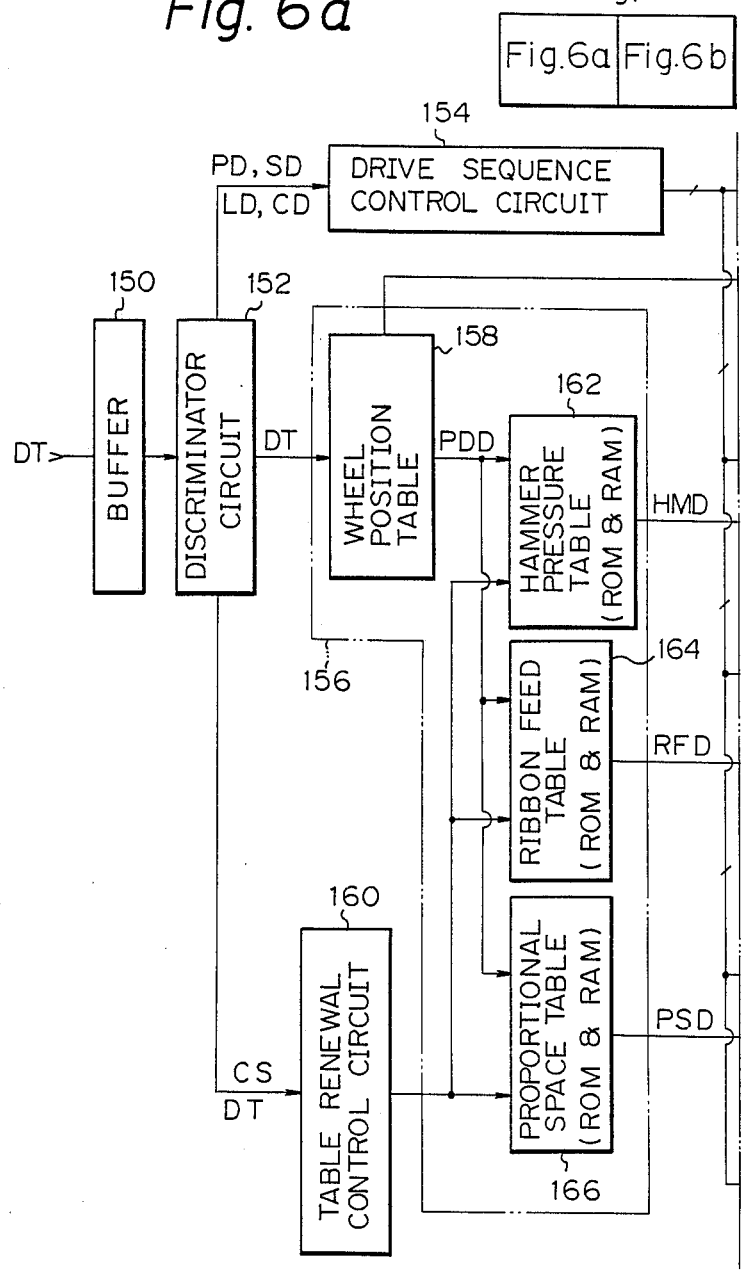
FIGS. 6a and 6b are combined to constitute a block diagram of a control apparatus for a hammer type impact printer embodying the present invention.
Figure 6B:
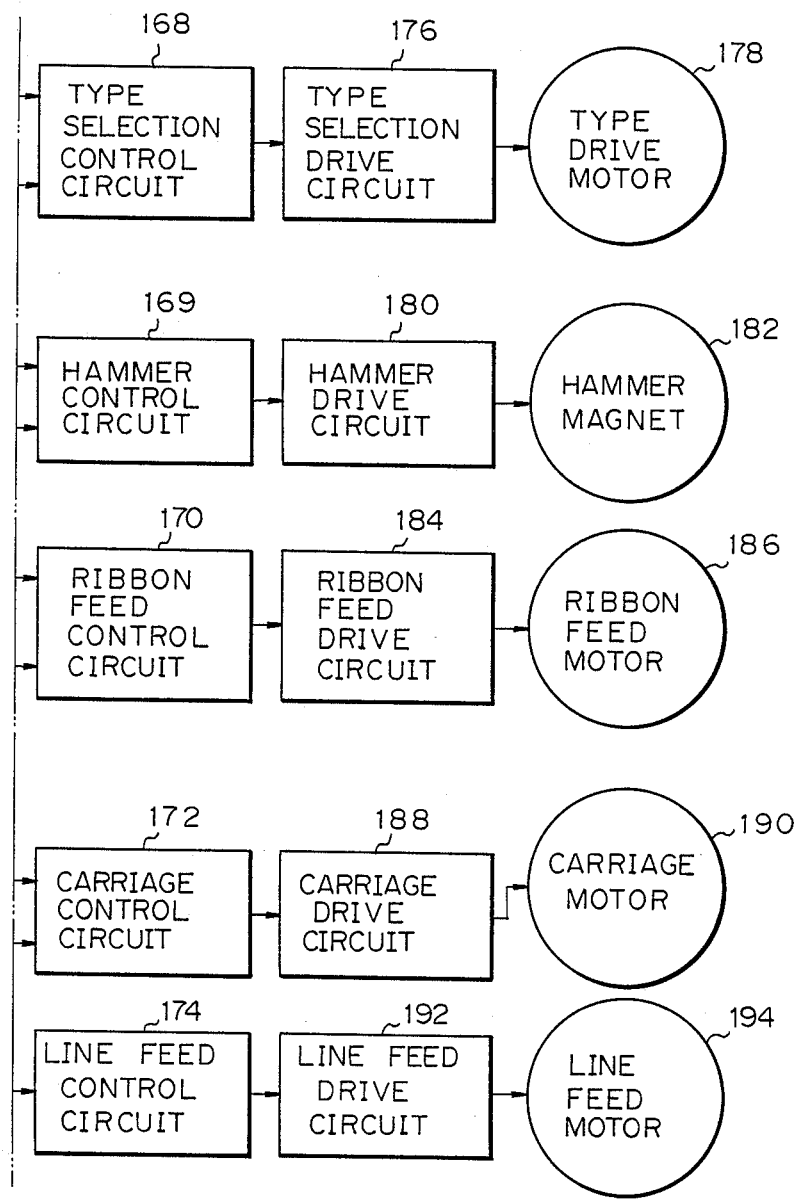

Referring now to FIG. 6, a printer control apparatus embodying the present invention is shown. Data DT is sequentially fed to the control apparatus from a microcomputer or the like installed in a data processing system (not show) with which the printer is associated. The data DT is once accumulated in a buffer 150 and inputted in a discriminator circuit 152. The data DT has eight bits which may be allotted, for example, to indicate a type to be selected (type data), a spacing operation for space of one character, a line feeding operation for incrementaly feeding a sheet vertically, a carriage returning operation for returning the carriage to a home position, a table altering or renewing operation, a hammer pressure, a ribbon feed and a proportional space.

In this embodiment, the input data DT uses ASCII codes while an instruction for a table renewal is provided by sequentially transferring "ESC" code and "+" code.

The discriminator circuit 152 identifies the content of the input data DT. If the data DT is an operation command commanding printing, spacing, line feed or carriage return, the discriminator 152 supplies a drive sequence control circuit 154 with an operation command signal PD, SD, LD or CD. In response to a print command, the discriminator 152 delivers type code input data DT to a wheel position table 158 of a memory 156. Further, in response to a table renewal command, the discriminator 152 supplies a table renewal control circuit 160 with a control signal CS and the input data DT.

The memory 156 is made up of a read only memory or ROM and a renewable storage means or in the form of RAM. The wheel position table 158 is a code conversion table adapted to convert a type code into type position data of the type wheel and stored in advance in the ROM. The wheel position table 158 feeds type position data PDD corresponding to the input type code input data DT to a hammer pressure table 162, a ribbon feed table 164, a proportional space table 166 and a type selection control circuit 168, which will be described later.

Stored individually in the ROM or the RAM, the hammer pressure table 162, ribbon feed table 164, and proportional space table 166 are the code conversion tables for transforming the type position data PDD from the wheel position table 158 into a hammer pressure, a ribbon feed, and a proportional space, respectively.

Thus, in accordance with this embodiment, a code conversion table corresponding to a standard type wheel in stored in the ROM as fixed data, while when the standard type wheel is replaced with another type wheel, a code conversion table corresponding to the new type wheel will be stored in the RAM.

The hammer pressure table 162, ribbon feed table 165 and proportional space table 166 supply a hammer control circuit 169, a ribbon feed control circuit 170 and a carriage control circuit 172 with hammer pressure data HMD, ribbon feed data RFD and proportional space data PSD, respectively, each of which corresponds to the type position data PDD.

In response to the control signal CS from the discriminator 152, the table renewal control circuit 160 starts a renewal control on each of the tables 162, 164 and 166 whereby a hammer pressure, a ribbon feed and a proportional space corresponding to a type indicated by the input data DT are stored in the RAM as code conversion tables. After the renewal of tables, the table renewal control 160 operates such that the type position data PDD from the wheel position table 158 is entered into the RAM instead of the ROM. Details of such a procedure will be described later.

The drive sequence control circuit 154, in response to an operation command signal PD, SD, LD or CD from the discriminator 152, controls the hammer control 169, ribbon feed control 170, carriage control 172 or line feed control 174 to practice the operation instructed by the command signal.

The type selection control circuit 168 responds to the wheel position data PDD from the wheel position table 158 to control a type selection drive circuit 176, so that a type drive motor 178 is driven to rotate the type wheel 66 until a desired type reaches a predetermined impact position.

The hammer control circuit 169, based on the hammer pressure data HMD from the hammer pressure table 162, controls a hammer drive circuit 180 to drive a hammer magnet 182. Then, the hammer 72 will hit against a selected type of the type wheel 66 with a necessary pressure so as to print out data.

The ribbon feed control circuit 170 supplied with the ribbon feed data RFD from the ribbon feed table 164 controls a ribbon feed drive circuit 184 so that a ribbon feed motor 186 is driven to move the ribbon 126 a necessary distance.

The carriage control circuit 172, in response to the proportional space data PSD from the proportional space table 166, controls a carriage drive circuit 188 to drive a carriage motor 190 until the carriage 56 moves a necessary proportional space. For a spacing operation, the carriage 56 will be moved a predetermined amount of space.

The line feed control circuit 174 is adapted to control a line feed drive circuit 192 such that a line feed motor 194 is driven to feed a sheet an incremental one line.

Referring to FIGS. 7 and 8, there will be described input data DT which will be transferred from the data processing system to the printer control apparatus for practicing a data renewing operation when the type wheel on the carriage is changed from standard one to another.

FIG. 7 shows an example of input data DT arranged to alter the control data for all the types of a type wheel. The data DT has the first byte for ASCII code ("0011011") and the second byte for "+" code ("0101011") which are transferred in succession. Thereafter, from the third byte and onward, hammer pressures (HP), ribbon feeds (RF) and proportional spaces (PS) for all the types on a type wheel are transferred sequentially in the order or type positions (type addresses) or the order of types to be written in the code conversion tables. The number of type elements are "94" by way of example in FIG. 7.

FIG. 8, on the other hand, indicates an example of input data DT for altering the control data on a part of the type elements of a type wheel. In the first and second bytes, "ESC" code are transferred sequentially. In the third byte and onward, a type code indicating a type element whose control data should be renewed and data on its hammer pressure (HP), ribbon feed (RF) and proportional space (PS) are transferred in succession, followed by another set of such code and data if any. At the end of the renewal, "ESC" code is transferred. In FIG. 8, the third byte "1000001" is code data indicating the alphabet "A" and the fifth byte "1100001" code data, indicating the alphabet "a".

Figure 9:
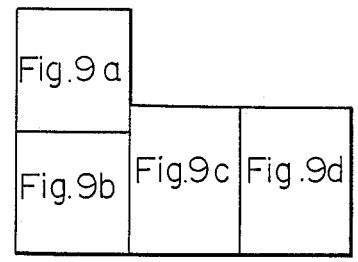
FIG. 9 illustrates how
Figure 9A:
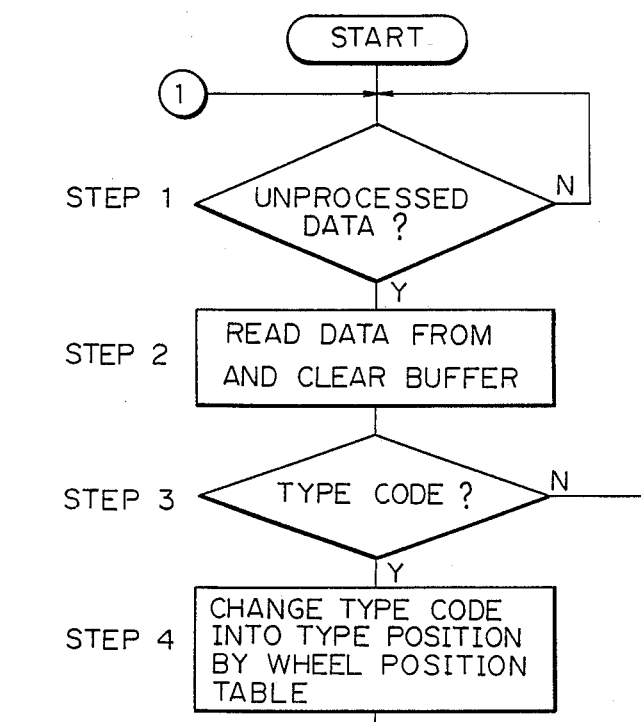
FIGS. 9a, 9b, 9c and 9d are combined to constitute a flowchart of a printer control which the control apparatus shown in FIG. 6 practices.
Figure 9B:
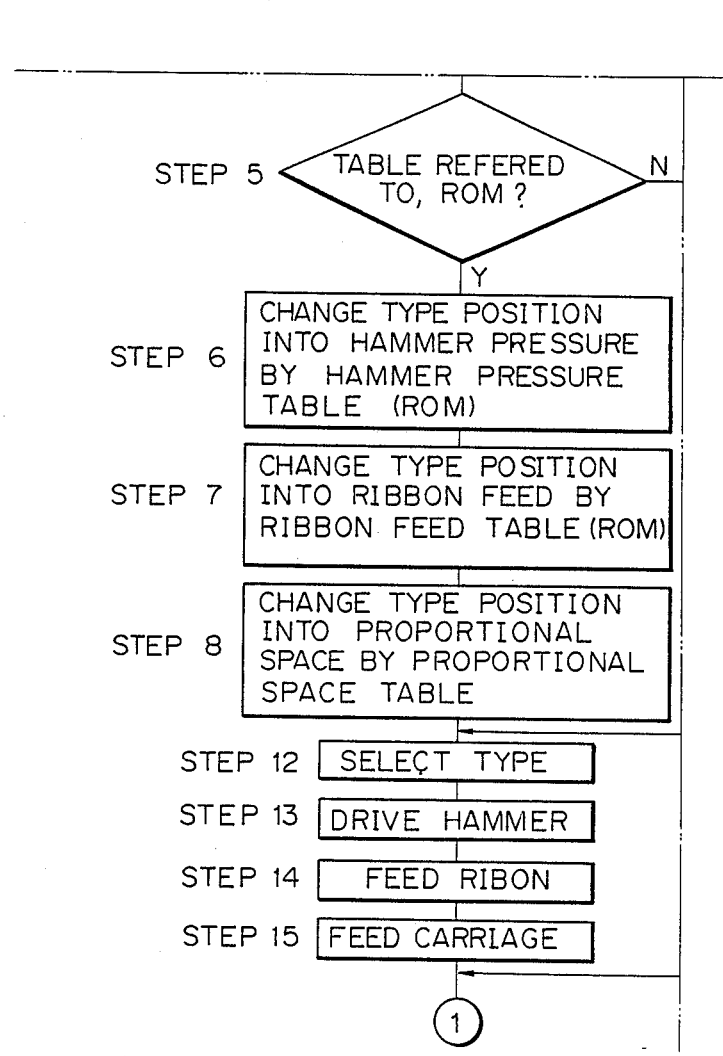
Figure 9C:
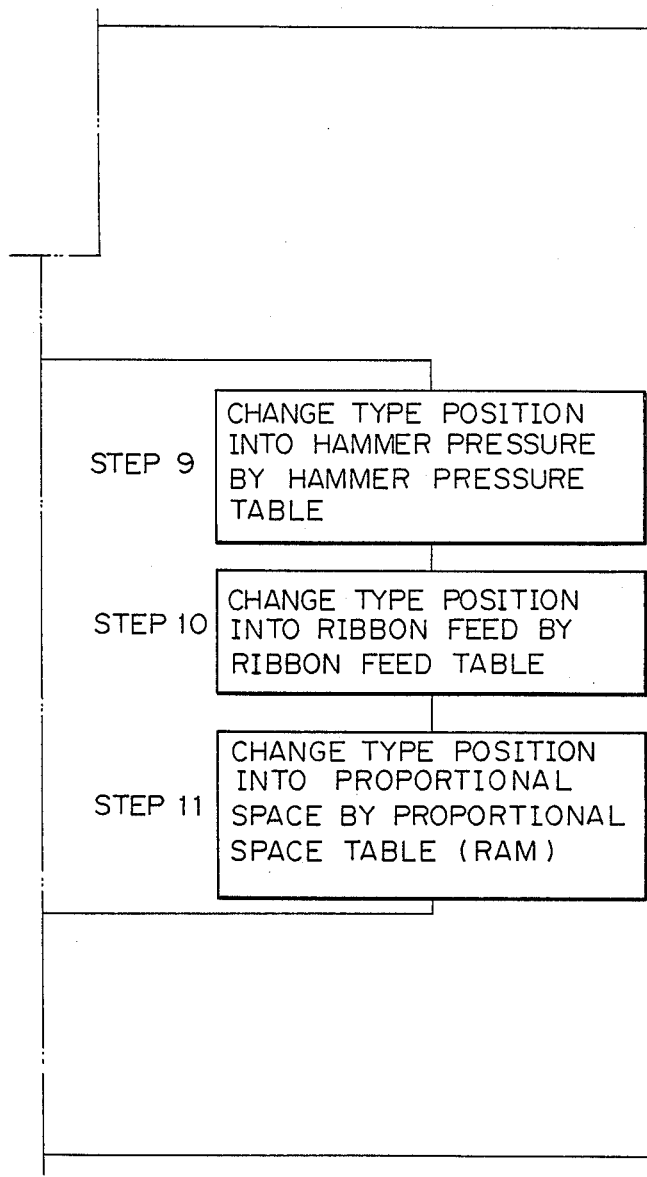
Figure 9D:
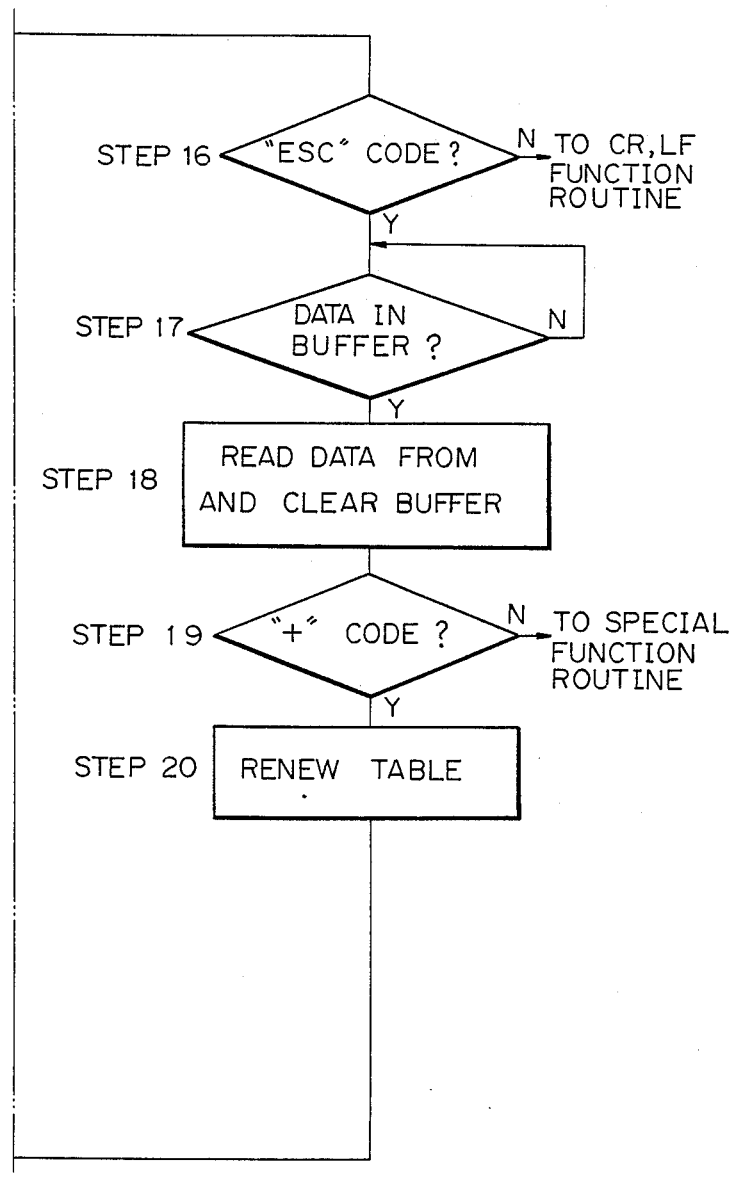
Figure 10:
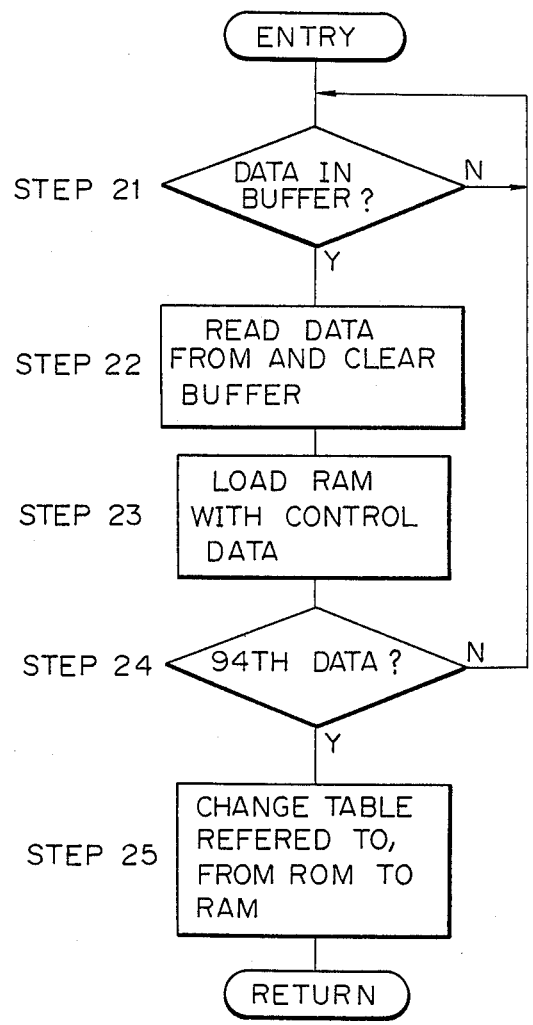
FIG. 10 is a flowchart indicating an example of a subroutine for the table renewal shown in FIG. 9.
Figure 11:
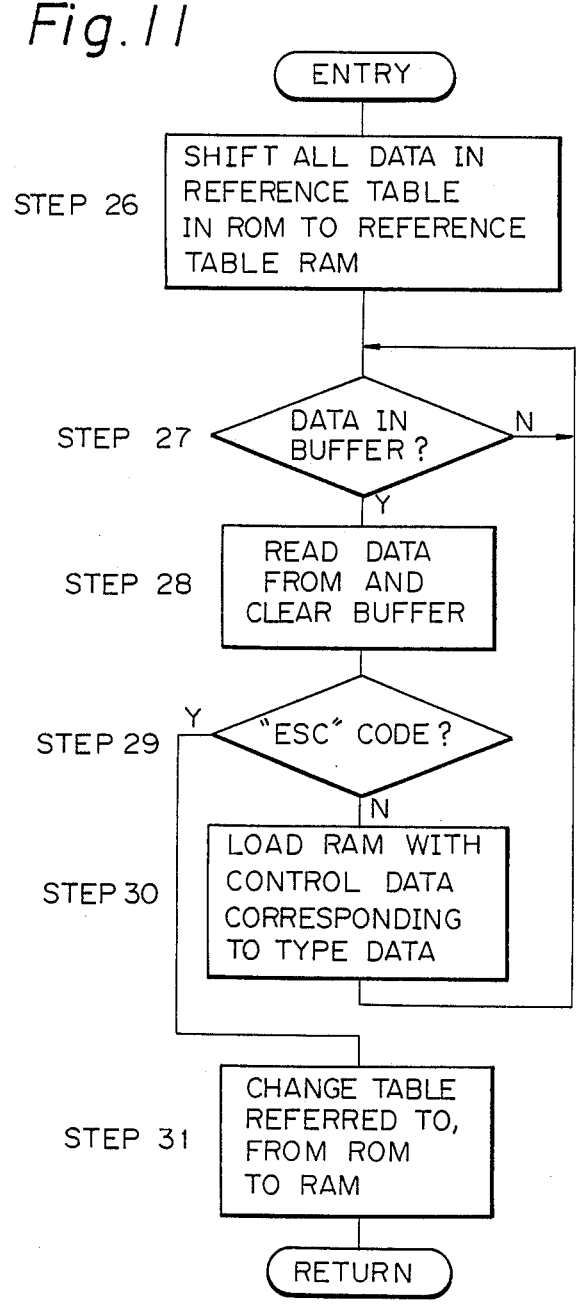
FIG. 11 is a flowchart showing another example of the subroutine for the table renewal of FIG. 9.

Reference will be made to FIGS. 9–11 for describing the printing operation and the table renewing operation which the printer control apparatus will practice.

At STEPS 1 and 2 in FIG. 9, whether or not unprocessed data is present in the buffer 150 is checked and, if YES, input data DT is inputted in the discriminator 152 while the buffer 150 is cleared. At STEP 3, the discriminator 152 determines whether or not the input data is a type code and, if YES, STEPS 4–15 are performed sequentially to print out data. If NO, the operation proceeds to STEP 16 which will be described. At STEP 4, the type code input data DT is transformed by the wheel position table 158 into type position data PDD. At STEP 5, whether the table referred to is the ROM or not is determined and, if YES, STEP 6 is carried out but, if NO, then STEP 9. Stated another way, it is determined which one of the tables 162, 164 and 166 stored in ROM and the tables 162, 164 and 166 stored in RAM should be used as code conversion tables for converting the type position data PDD into a hammer pressure, a ribbon feed and a proportional space.

At STEPS 6-8, with reference to the hammer pressure table 162, ribbon feed table 164 and proportional space table 166 stored in the ROM, the type position data PDD is transformed into hammer pressure data HMD, ribbon feed data RFD and proportional space data PSD. At STEPS 9-11, the type position data PDD is transformed into hammer pressure data HMD, ribbon feed data RFD and proportional space data PSD with reference to the hammer pressure table 162, ribbon feed table 164 and proportional table 166 stored in the RAM. At STEPS 12-15, the drive sequence control circuit 154 sequentially drives the type selection control 168, hammer control 169, ribbon feed control 170 and carriage control 172. Then, the type indicated by the type position data PDD is brought to the impact position, the hammer 72 is driven to hammer the type with the pressure indicated by the hammer pressure data HMD, the ink ribbon 126 is fed by an amount indicated by the ribbon feed data RFD, and the carriage 56 is moved a distance indicated by the proportional space data PSD. The printing action terminates here and returns to STEP 1. In this way, the printer can be controlled during printing operations merely by entering type data as the input data DT. At STEP 16, the discriminator 152 determines whether the input data DT is "ESC" code or not and, if YES, STEP 17 is performed but, if NOT, the operation jumps to a function routine such as a line feed operation (LF) or a carriage return operation (CR). At STEPS 17 and 18, whether or not input data DT is stored in the buffer 150 is checked and, if YES, it is entered with the buffer 150 cleared. At STEPS 19 and 20, the discriminator 152 determines whether the input data is "+" code or not, and, if YES, the operation returns to STEP 1 after the table renewal but, if NOT, the operation jumps to a special function routine.

Referring to FIGS. 10 and 11, other examples of the table renewing subroutine will be described with reference to FIG. 9. FIG. 10 represents a case wherein input data DT is transferred in the manner of FIG. 7 while FIG. 11 represents a case wherein input data DT is transferred in the manner of FIG. 8.

At STEPS 21 and 22 in FIG. 10, whether or not input data DT is present in the buffer 150 is checked. If YES, the data DT is entered and the buffer 150 is cleared; the discriminator 152 transfers the input data DT to the table renewal control 160. At STEPS 23 and 24, the table renewal control 160 sets in RAM hammer pressures, ribbon feeds and proportional spaces concerning all the 94 types in the order of type positions or of types to be written in the code conversion tables. Thus stored in the RAM are the code conversion tables corresponding to a specific type wheel 66 mounted on the carriage, i.e. hammer pressure table 162, ribbon feed table 164 and proportional space table 166. At STEP 25, the table renewal control 160 is operated to switch the tables to be referred to from those stored in the ROM to those stored in the RAM. This conditions the RAM to receive type position data PDD from the wheel position table 158.

In FIG. 11, at STEP 26, all the data of the hammer pressure table 162, ribbon feed table 164 and proportional space table 166 stored in ROM are shifted to RAM. At STEPS 27 and 28, whether or not input data DT is present in the buffer 150 is checked. If YES, it is entered with the buffer 150 cleared and the data is transferred to the table renewal control 160. At STEPS 29 and 30, of all the data shifted from the ROM to the RAM by the table renewal control 160, the hammer pressure, ribbon feed and proportional space data are altered only for a type code which has been delivered as input data DT. Thus, the RAM stores a hammer pressure table 162, a ribbon feed table 164 and a proportional space table 166 each corresponding to the new type wheel loaded on the carriage. It will be seen that in the example shown in FIG. 8 the control data are renewed only for the types "A" ("1000001") and "a" ("1100001"). Finally, in STEP 31, the reference tables are changed from those in the ROM to those in the RAM.

By the above procedure, when the type wheel on the carriage is replaced, various control data corresponding to a new type wheel are transferred concentratedly from the data processing system to the printer so that the RAM stores code conversion tables corresponding to the new type wheel.

The various control data on type wheels may be stored in suitable memory means such as a floppy disc or a paper tape so that the stored data can be read and transferred to the printer when the type wheel is replaced.

Also, the RAM for storing code conversion tables may be constituted by a core memory, a bubble memory, a floppy disc or IC memory, for example.

While the present invention has been shown and described as employing a type wheel having 94 type members in total, it will be seen that it is applicable in the same manner to a type wheel having 128 type members, a type element in the form of a ball, etc.

Though the embodiment has used ASCII codes, use of any other special codes such as JIS codes will not affect the principle of the present invention at all.

The embodiment has employed ROM for storing code conversion tables as fixed data, in addition to RAM. This is not restrictive in any way; code conversion tables may be stored in RAM only. Furthermore, an arrangement may be made such that only the code conversion table for ribbon feeds is stored in ROM as data which is unrenewable, instead of storing all the conversion tables in RAM.

Thus, in accordance with embodiment described hereabove, various control data concerning any kind of type element mounted on the carriage can be transferred altogether to the printer so that the code conversion tables are replaced with those corresponding to the specific type element. The time period necessary for the replacement of the code conversion tables is negligibly short. Accordingly, when the type element is replaced with another, type data need only be entered from the data processing system to the printer during a print control. This avoids intricacy of data processing operation required for printer control as well as an increase of data transfer time.

Figure 12:
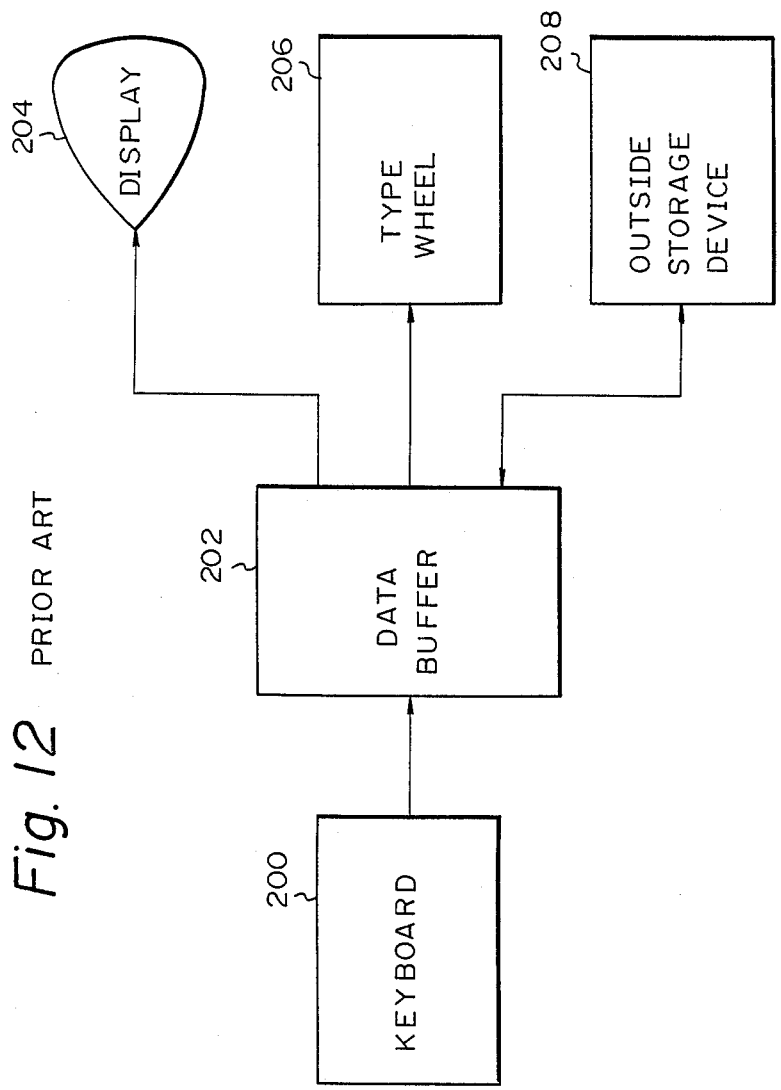
FIG. 12 is a block diagram showing an example of a prior art word processor.
Figure 13:
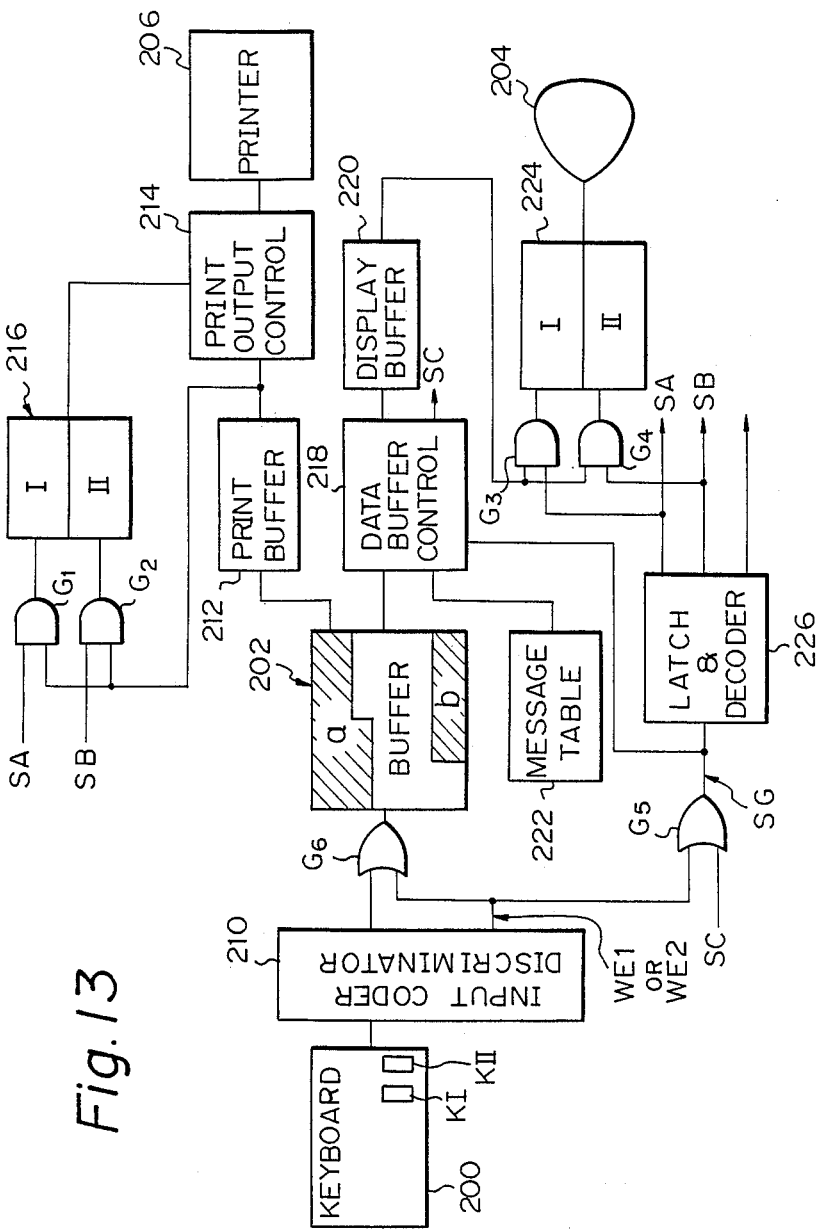
FIG. 13 is a block diagram showing another embodiment of the hammer type impact printer of the present invention.

Referring to FIGS. 12 and 13, another embodiment of the present invention is shown which is designed to selectively use a limited number of ROM corresponding to the number of type wheels usable for a printer and each storing code conversion tables for each type wheel as fixed data, in place of the renewable storage means (RAM) mentioned in the first embodiment. This kind of design will be desirable where the number of interchangeable type wheels is relatively small, such as two to three.

For the convenience of description, the embodiment shown in FIGS. 12 and 13 is supposed to be related with a printer associated with a word processor and having two kinds of interchangeable type wheels, i.e. a most frequently used type wheel with standard type members and a special type wheel with symbols for scientific expression.

Referring to FIG. 12, a conventional word processor comprises a keyboard 200, a data buffer 202, a 1-line display 204, a printer 206 using type wheels, and an outside storage device 208. The data buffer 202 is adapted to store data entered through the keyboard 200 or data read from the outside storage device 208. The 1-line display 204 displays the data stored in the data buffer 202 line by line while the printer 206 prints out the same data one line at a time. The outside storage device 208 in the form of a floppy disc, for example, is used to store the data in the data buffer 202. Alphanumeric characters or like code data entered through the keyboard 200 are displayed successively on a cursor which indicates an input position on the 1-line display 204. After one line of data has been entered, the content of the data buffer 202 is transferred to the outside storage device 208 just before it overflows. Alternatively, the content of the data buffer 202 may be coupled to the printer 206 to be printed out. Data can be added, omitted or corrected by operating a cursor control key on the keyboard 200 until the cursor reaches a desired position on the display.

Referring to FIG. 13, the data buffer 202 has a first buffer area a and a second buffer area b. The printer control apparatus also includes an input code discriminator circuit 210, a print buffer 212, a print output control circuit 214 and a print table assembly 216 storing printer control data and made up of a table I for the standard type wheel and a table II for the special type wheel for scientific expression. Also included in the printer control apparatus are a data buffer control circuit 218, a display buffer 220, a message table 222 and a character pattern memory 224 having a memory area I for the standard type wheel and a memory area II for the special type wheel. Further included in the printer control apparatus are a latch and decoder 226 for wheel change data, AND gates $G_1$–$G_4$ and OR gates $G_5$ and $G_6$. Text data DT' is coupled from the input code discriminator 210 the OR gate $G_6$. Wheel change control codes $WE_1$ and $WE_2$ are delivered from key input means when wheel change keys $K_I$ and $K_{II}$ are manipulated, respectively. In response to the wheel replacement control code $WE_1$ or $WE_2$, the latch and decoder 226 produces a gate switch signal SA or SB. The data buffer control 218 delivers a signal SC when the cursor and the wheel change control code coincides with each other. The OR gate $G_5$ produces an output signal $SG_5$.

The printer control circuit shown in FIG. 13 differs from conventional one in the following various respects.

(1) The keyboard 200 shown in FIG. 12 is additionally provided with the wheel change keys $K_I$ and $K_{II}$ for indicating the selection of the standard and special type wheels, respectively. Accordingly, when the input code discriminator 210 is supplied with the wheel change control code $WE_1$ or $WE_2$ corresponding to the key $K_I$ or $K_{II}$, it delivers the code as a control code.

(2) The latch and decoder 226 is employed for holding wheel change data and producing the signal SA or SB which corresponds to the kind of a specific type wheel.

(3) The print table assembly 216 is made up of the table I corresponding to the standard type wheel and the table II corresponding to the special type wheel.

(4) The character pattern memory 224 has the memory area I for storing character pattern data on the standard type wheel and the memory area II for storing character pattern data on the special type wheel.

(5) The AND gates $G_1$ and $G_2$ are associated with the print tables 216 in order to switch the tables I and II from one to the other.

(6) The character pattern memory 224 is provided with the AND gates $G_3$ and $G_4$ which switch the memory areas I and II from one to the other.

(7) The message table 222 stores messages indicating type wheel changes and the kinds of type wheels.

These differences will be described in more detail later. The rest of the circuit is similar to the control circuit of a prior art word processor.

The blocks of FIG. 13 common to those of the prior art word processor will be outlined hereunder.

The input code discriminator 210 determines whether the key input is the text data or the function data. The data buffer 202 stores in the first buffer area a the data appearing on the display 204 before the cursor position and, in the second buffer area b, the data after the cursor position. The print buffer 212 is loaded with one line of data when one line of data has been shifted to the first buffer area a of the data buffer 202, that is, when the cursor on the display 204 has detected a line change code. The print output control 214 processes the content of the print buffer 212 and feeds it to the printer. The print table assembly 216, as previously mentioned, is made up of the table I for the standard type wheel and the table II for the special type wheel.

In a printer associated with a word processor, as well as others, various delicate controls are required such as producing a variable intercharacter spacing (proportional printing), adjusting the interword spacing to vertically align the ends of lines (justification), and controlling the printing pressure of each character, different from ordinary printers which print out the content of the print buffer 212 simply at fixed pitches. Therefore, there must be prepared a displacement table, a print pressure table and other tables corresponding to respective character codes. Specific tables are used in accordance with the font on a type wheel or the kind of characters on a type wheel. The print tables 216 store such groups of tables which will be referred to in correspondence with the codes in the print buffer 212.

The data buffer control 218 loads the display buffer 220 with the data stored in the data buffer 202 one line at a time. The transfer of data to the display buffer 220 will occur when a character key is depressed, the cursor control key is depressed, a message as operation guidance is displayed, or the like. The message table 222 stores various messages for operation guidance. The character pattern memory 224 stores data of character patterns to be displaced on the display 204.

Now, of the additional provisions (1)–(7) in accordance with this embodiment, (1), (3) and (4) have already been discussed and, therefore, the following description will concentrate to (2) concerned with the latch and decoder 226, (5) and (6) concerned with the gates $G_1$–$G_4$ and (7) concerned with the message table 222.

The latch and decoder 226 comprises a register for latching wheel replacement data and a decoder for decoding the replacement data. The latch and decoder 226 is supplied with a signal $SG_5$ which the OR gate $G_5$ delivers in response to the wheel change control code $WE_1$ or $WE_2$ which in turn appears when the wheel change key $K_I$ or $K_{II}$ is operated. The latch and decoder 226 produces a gate switch signal SA in response to the control code $WE_1$ and a gate switch signal SB in response to the control code $WE_2$. In response to the wheel change control code $WE_1$, the signal SA becomes logical "1" and the signal SB logical "0"; in response to the control code $WE_2$, the signal SA becomes logical "0" and the signal SB logical "1".

Such gate switch signals SA and SB are coupled to the AND gates $G_1$–$G_4$ as have been described in the items (5) and (6). Accordingly, when the wheel change key $K_I$ designating the standard type wheel is selected, the wheel change control code $WE_1$ is generated to make the gate switch signal SA logical "1" thereby opening the gates $G_1$ and $G_3$. Of the print tables 216, the table I corresponding to the standard type wheel is made effective by the AND gate $G_1$. Likewise, the memory area I of the character pattern memory 224 storing the pattern data of the standard type wheel is made effective by the AND gate $G_3$.

When the other key $K_{II}$ designating the special type wheel is manipulated, the wheel change control code $WE_2$ appears to render the gate switch signal SB logical "1" which causes the gates $G_2$ and $G_4$ to open. Then, the table II of the print tables 216 corresponding to the special type wheel is made effective by the AND gate $G_2$ while the memory area II of the character pattern memory 224 storing the pattern data of the special type wheel is made effective by the AND gate $G_4$.

The message table 222 stores messages indicating changes of type wheel and the kinds of type wheels. The messages may be, for example, "WHEEL CHANGE : STANDARD" to indicate the standard type wheel and "WHEEL CHANGE : SCIENTIFIC" to indicate the special type wheel. Data in the message table 222 is coupled to the display buffer 220 when the data buffer control 218 has been operated by the output signal $SB_5$ of the OR gate $G_5$, which receives the wheel change control code $WE_1$ or $WE_2$. In the event the final document is to be prepared, the data delivery from the message table 222 to the display buffer 220 occurs in response to the signal which appears upon coincidence of the cursor with the control code $WE_1$ or $WE_2$.

In operation, suppose that the wheel change key $K_I$ on the keyboard 200 has been selected to use the standard type wheel. Then, the input code discriminator 210 delivers a wheel change control code $WE_1$ which is stored in the first buffer area a of the data buffer memory 202 via the OR gate $G_6$. At the same time, the code $WE_1$ is passed through the OR gate $G_5$ and coupled to the latch and decoder 226 as a gate output $SG_5$, whereby the logical "1" gate switch signal SA is coupled to the AND gates $G_1$ and $G_3$. This makes the table I of the print tables 216 and the memory area I of the character pattern memory 224 effective, each of which corresponds to the standard type wheel.

Simultaneously, the output $SG_5$ of the OR gate $G_5$ is supplied to the data buffer control 218 as a wheel change request signal. The content of the display buffer 220 is switched from the data buffer 202 to the message table 222, whereby the display buffer 220 produces a message corresponding to the wheel change control code $WE_1$ which designates the standard type wheel. The 1-line display 204 now displays the message "WHEEL CHANGE : STANDARD" designating the standard type wheel.

In view of the very frequent use of a standard wheel for ordinary applications, such an arrangement is permissible that every time the word processor starts to prepare a text, the wheel change control code $WE_1$ is automatically delivered to initialize the word processor accordingly.

The operator looking at the 1-line display 204 replaces the type wheel if not the standard type wheel and, then, operates a reset key on the keyboard. The reset key cancels the message on the 1-line display 204 and allows the content of the data buffer 202 to appear instead. Under this condition, preparation of a text is started.

When the key input is the text data DT', the data is sequentially fed from the OR gate $G_6$ to the data buffer 202. Every time one line of data is fully loaded in the data buffer 202, it is printed out by the printer 206 while being shifted to the outside storage device 208. Accordingly, the file stored in the outside storage device 208 has the wheel change control code $WE_1$ at its head and text data after the control code $WE_1$.

Suppose that a need for symbols for scientific applications has arisen while the text is prepared by the standard type wheel. In this instance, the wheel change key $K_{II}$ at the keyboard 200 is depressed and the input code discriminator 210 discriminates a code of the wheel change key $K_{II}$. This code is stored in the first buffer area a of the data buffer 202 as a wheel change control code $WE_2$ and, at the same time, coupled to the latch and decoder 226 via the OR gate $G_5$ by the gate output $SG_5$. This makes the gate switch signal SB logical "1" and the gate switch signal SA logical "0", so that the table II of the print table assembly 216 and the memory area II of the character pattern memory 224 are individually rendered effective.

At the same time, the output $SG_5$ of the OR gate $G_5$ is coupled to the data buffer control 218 as a wheel change request. The content of the data buffer 202 is then switched from the data buffer 202 to the message table 222. As a result, the message on the display 204 is changed from "WHEEL CHANGE : STANDARD" to "WHEEL CHANGE : SCIENTIFIC" based on the content of the text. The operator looking at this display replaces the type wheel, operates the reset key to cancel the display of the preceding message, and then returns to the text. It should be remembered here that changing the type wheel somewhere on a line of the text would cause the 1-line display 204 to indicate not only the characters before the cursor but those after the cursor in the new character patterns.

In the operations for displaying and printing the subsequent data input, use is made of the memory area II of the character pattern memory 224 storing the special or scientific pattern data and the table II of the print tables 216 storing the scientific control data.

When it is desired to replace the special type wheel with the original standard type wheel, one will depress the wheel change key $K_I$ to repeat the procedure which has been generated by the initial depression of the wheel change key $K_I$ as previously stated.

The file prepared by the above procedure is sequentially stored in the outer storage device 208 of FIG. 1 one line at a time, as in the conventional word processor. A final document can be obtained from the complete file by transferring data from the outside storage device 5 to the print buffer 212 via the data buffer 202 one line at a time. The data at the print buffer 212 is supplied to the printer 206 via the print output control 214, which is generally referred to as "playback". In this instance, it is the second buffer area b that is initially loaded from the outer storage device 208 into the data buffer 202; nothing is loaded in the first buffer area a, that is, the cursor is positioned at the head of the file.

Where the data is to be coupled to the printer 206, the data is transferred from the second buffer area b to the first a in accordance with the continous movement of the cursor. When the control code $WE_1$ or $WE_2$ inputted during the previous text preparation has been detected while data is transferred from the second buffer area b to the first a, the data buffer control 218 delivers a detection signal SC. This signal SC indicative of the coincidence between the cursor and the wheel change control code is equivalent in function to the operation of the wheel change key $K_I$ or $K_{II}$. The output $SG_5$ of the OR gate $G_5$ activates the latch and decoder 226 to generate a gate switch signal SA or SB and, at the same time, it is coupled to the data buffer control 218 as a wheel change request. Then, the display 204 shows a message stored in the message table 222 to indicate a change of type wheel and its kind. The detection signal SC is also fed from the data buffer control 218 to a printer control section (not shown) thereby immediately interrupting the operation of the printer.

Suppose that the wheel change control code $WE_1$ has been entered designating the standard type wheel during the previously discussed preparation of text data and before the entry of text data DT'. Then, the latch and decoder 226 delivers a logical "1" gate switch signal SA in response to a detection signal SC, which makes effective the table I storing the control data of the standard type wheel and the memory area I of the character pattern memory 224 storing the pattern data which corresponds to the standard type wheel. At the same time, the content of the message table 222 is fed to the display buffer 220 causing the display 204 to display "WHEEL CHANGE : STANDARD". One, based on this indication, confirms the kind of the type wheel and, if it is not the standard one, replaces it. Thereafter, he manipulates the reset key to cancel the message on the display 204 and start a printing operation.

When the wheel change control code $WE_2$ has been detected during the printing operation, the latch and decoder 226 renders the gate switch signal SB logical "1" and the preceding signal SA logical "0". In this situation, the table II and memory area II each storing the control data for scientific applications are made effective. Simultaneously, the message table 222 supplies data indicating a change of the type wheel to the special one so that the display 204 indicates the message "WHEEL CHANGE : SCIENTIFIC". Then, the operator replaces the type wheel with the one for scientific applications, operates the reset key to cancel the message on the display 204 and resumes the printing operation.

It will be seen from the above that the second embodiment described so far with reference to FIGS. 12 and 13 promotes the use of not only a standard font but various special fonts such as for scientific expressions for a printer while a document is prepared. The kind of a type wheel to be loaded in the carriage is indicated on a display so as to facilitate replacement. In the event of preparation of a final document, not only the printer is stopped but the kind of a type wheel used for preparing the file is indicated on the display. This will allow the type wheel to be changed quickly yet positively even though the operator may have alternated with another or a long period may have lapsed after the preparation of the file. Additionally, such advantages are achievable with a simple circuit arrangement which affords another advantage in cost.

Various modifications will become possible for those skilled in the art after receiving the teachings of the present disclosure without departing from the scope thereof. For example, the number of kinds of type wheels available for the printer is not limited to two, as has been employed for the second embodiment, but may be three or more if desired. Such an increase in the number of type wheels should be accompanied by corresponding increases in the wheel change keys, print tables 216, character pattern memories 224, print tables 216, character pattern memories 224, gates $G_1-G_4$, gate switch signals delivered from the latch and decoder 226, messages stored in the message table 222, etc. The word processor is not limited to one using alphanumeric characters but may be replaced by one using any other kind of characters. The 1-line display used for the word processor shown in FIG. 12 may be substituted for by a cathode ray tube or like display means. Thus, it will be seen that the present invention is applicable to every possible type of word processor furnished with printers which employ type wheels.

I claim:

1. A control apparatus for a proportional spacing printer constructed to selectively print with first and second fonts comprising a common set of characters, widths of at least some characters in the first font differing from widths of respective characters in the second font, comprising:

read-only storage means for pre-storing first proportional space data for the first font;

read-write storage means for storing second proportional space data for the second font;

buffer means for temporarily storing character codes corresponding to said characters respectively and the second proportional space data input thereto;

discrimination means operatively connected to the buffer means for discriminating the character codes from the second proportional space data;

transfer means operatively connected to the buffer means and discrimination means for transfering the second proportional space data discriminated by the discrimination means from the buffer means to the read-write storage means; and control means for controlling the printer to perform proportional printing with the first font using the first proportional space data stored in the read-only storage means and to perform proportional printing with the second font using the second proportional space data stored in the read-write storage means;

the transfer means being further operatively connected to the read-only storage means for initially transferring the first proportional space data from the read-only storage means to the read-write storage means, the transfer means subsequently transferring the second proportional space data from the buffer means to the read-write storage means to replace respective data in the read-write storage means, the second proportional space data comprising data for only those characters of the second font having widths differing from widths of respective characters in the first font.

2. A printer as in claim 1, in which the printer is a hammer type impact printer, the read-only storage means further storing hammer pressure data.

3. A printer as claimed in claim 2, in which the read-write storage means further stores hammer pressure data.

4. A printer as claimed in claim 10, in which the second proportional space data for each character comprises:
- a code for discriminating the second proportional space data from the character codes;
- a code designating said character;
- a proportional space value for said character; and
- a code designating the end of the second proportional space data for said character.

* * * * *